W. C. BUHLES.
METHOD OF CANNING FRUIT.
APPLICATION FILED AUG. 10, 1910.
1,271,847.
Patented July 9, 1918.
2 SHEETS—SHEET 2.
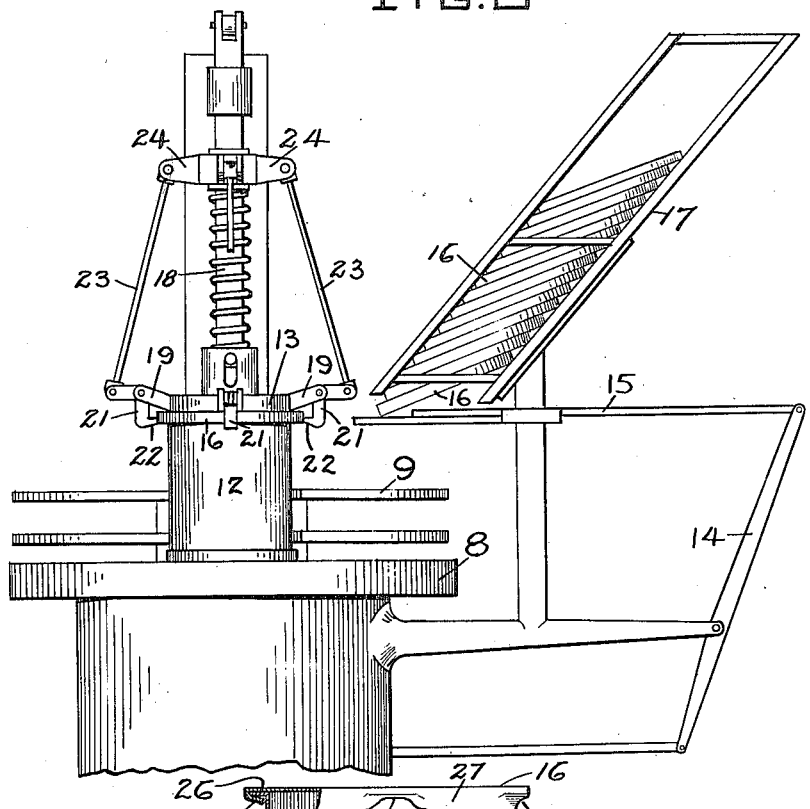
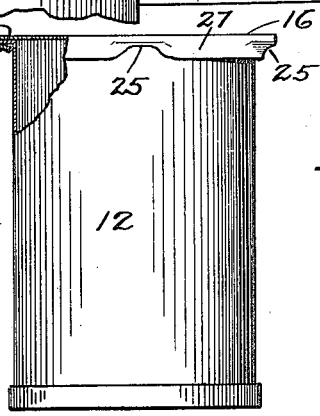
WITNESSES:
INVENTOR
WILLIAM C. BUHLES.
by Miller & White
his ATTORNEYS

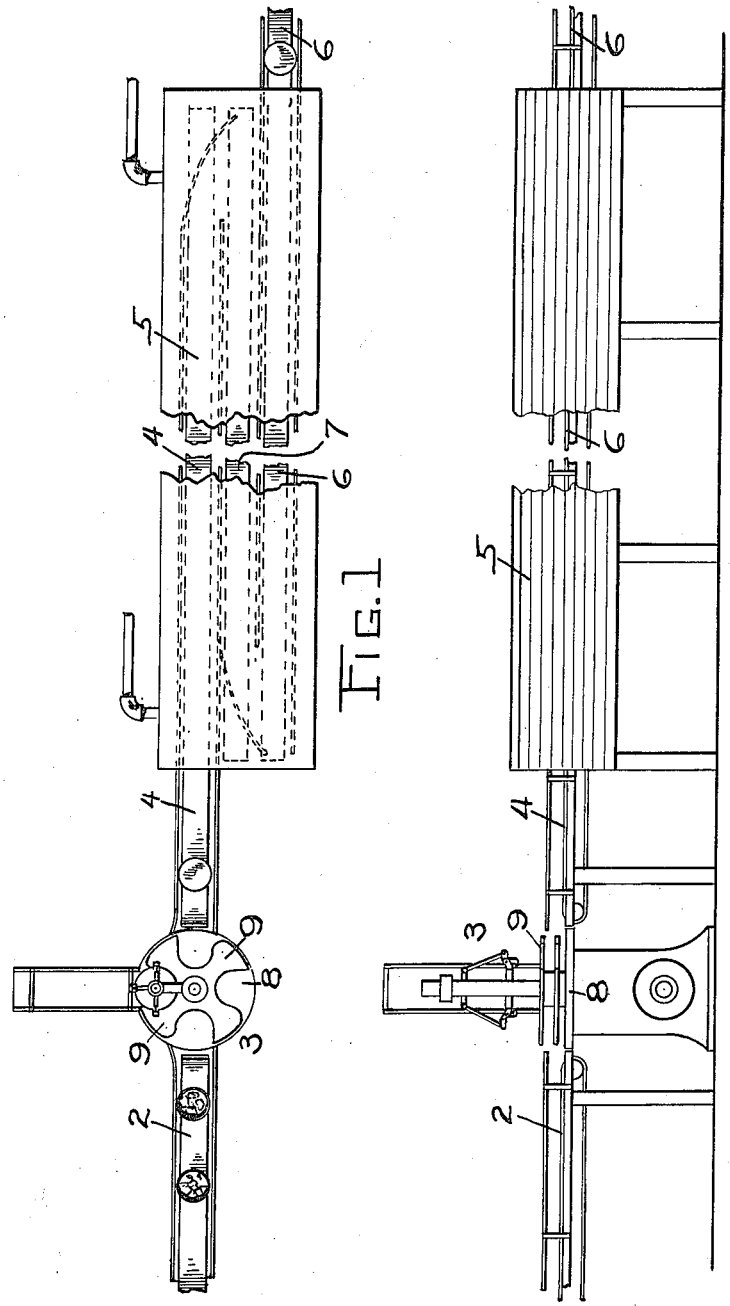

UNITED STATES PATENT OFFICE.

WILLIAM C. BUHLES, OF SAN FRANCISCO, CALIFORNIA, ASSIGNOR TO BREMER & BRUCKMANN, OF BRAUNSCHWEIG, GERMANY, A COPARTNERSHIP.

METHOD OF CANNING FRUIT.

1,271,847.             Specification of Letters Patent.           Patented July 9, 1918.

Application filed August 10, 1910. Serial No. 576,606.

*To all whom it may concern:*

Be it known that I, WILLIAM C. BUHLES, a citizen of the United States, and a resident of the city and county of San Francisco and State of California, have invented certain new and useful Improvements in the Methods of Canning Fruit, of which the following is a specification.

The invention relates to an improved method of canning or preserving fruits, vegetables, foods, or other articles which are adapted to be canned. While I have entitled the invention a Method of canning fruit, and will describe it as such in the following description, it is to be understood that the invention applies to all substances which are preserved by being processed or sterilized in the hermetically sealed receptacles containing them.

The object of the invention is to provide a simple and cheap method of canning fruit by a more sanitary process than heretofore used.

The invention relates particularly to improvements in the so-called sanitary method of canning. In this method, as employed at the present time the cans are filled with a quantity of fruit and syrup and are then placed primarily in a steam chamber, or cooker, for an adequate period of time to heat the contents sufficiently to cause enough of the air to be expelled prior to applying and hermetically sealing the covers to the cans, so that a partial vacuum will be formed in the cans after cooling.

The steam chamber is generally provided with a series of conveyers or drapers for progressing the cans through the chamber, thereby allowing the operation to be carried on continuously. After the cans have passed through the steam chamber and while they are still heated, the covers are applied and sealed, and the cans and contents are again heated.

During the passage through the steam chamber, however, the cans are open, allowing the steam to come in contact with the fruit. The fruit generally floats in the syrup and projects above the top of the can, and the hot steam coming in contact therewith heats that portion of the fruit to a higher temperature than is desirable, which is detrimental to the fruit. The cans being open are also exposed to the drippings within the steam chamber from the condensation of the steam. These drippings contain more or less foreign matter which, on coming in contact with the fruit in the cans, has a tendency to contaminate it.

My object is, therefore, to provide a simple method for covering the can during the cooking so as to prevent the steam and drippings from coming in contact with the fruit and still to allow the excess air and liquid within the can to be readily expelled by the heating of the can and contents. This invention applies more especially to the sanitary method of canning fruit in which the covers are sealed to the cans by double seaming.

In my improved method, I attach the permanent cover to the can before it enters the steam chamber in such manner that a seal is not formed and the air and the excess liquid in the can may be readily driven off as the contents become heated. The attachment of the cover is such that it allows the excess air and liquid in the can to pass out, but retains the solids in the can. The cover is attached in such manner that it cannot become displaced and when the can is removed from the steam chamber, the cover is in the correct position for double seaming. Thus the cans may be rapidly closed on automatic double seamers without allowing them to become cool.

The covers are attached to the can before the cooking operation and double seamed thereto after the cooking operation, which generally completes the preserving process. In some instances it may be advisable to subject the can to another cooking after the double seaming operation, but generally this step may be dispensed with.

Covers are double-seamed to cans in several distinct steps. The first operation generally consists in crimping portions of the flange of the cover under the flange of the can, but often in the first operation the whole flange on the cover is rolled under the flange of the can. In the second operation the flanges are generally bent down at an angle to the can, and in the third operation are pressed against the can. The methods are varied somewhat on different machines, but this is substantially the procedure.

This method possesses other advantageous features which, with the foregoing, will be set forth at length in the following description where I shall outline in full that form or embodiment of the apparatus for performing the invention which I have selected for illustration in the drawings accompanying and forming part of the present specification. It is to be understood that I do not restrict myself to the showing made by such drawings and description, as it is evident that other apparatus may be used to perform the necessary steps without varying from the scope or spirit of my invention.

Figure 1 is a plan or top view of the apparatus showing the cover attaching means and the steam chamber, part of the steam chamber being broken away to reduce the size of the figure.

Fig. 2 is a side elevation of the apparatus as shown in Fig. 1.

Fig. 3 is an elevation of one form of apparatus for attaching the cover to the can.

Fig. 4 is a view of the can with the cover attached.

The cans, which have been filled with the required amount of fruit and syrup, are placed on the traveling belt or conveyer 2, which carries them to the cover applying apparatus 3. The covers may be placed on the cans by hand and attached thereto by the apparatus or they may be placed and attached by the apparatus, or in any other manner that is found desirable. After the covers have been attached to the cans, they are placed on a conveyer 4 and carried into the steam chamber 5. A series of conveyers 4, 6 and 7 are arranged within the steam chamber to carry the cans back and forth therein, and guides are arranged adjacent to the conveyers to shift the cans from one to the other at the end of the run. The cans are brought out of the chamber 5 by the conveyer 6, and carried to the apparatus for permanently attaching and hermetically sealing the cover to the can.

The can is moved by the conveyer 2 onto the bed 8 of the apparatus and into engagement with the spider 9. The spider is then revolved a quarter revolution bringing the can 12 (Fig. 3) into position below the head 13 which is raised a sufficient distance to allow the can to be properly positioned below it. The lever 14 then moves to operate the feed-slide 15 and a cover 16 is fed from the rack 17 onto the can. The head 13, which is yieldingly mounted on the shaft 18, is moved downward to press the cover 16 firmly onto the can.

Pivotally attached to the ears 19 on the head 13 are the bent levers 21, each having a tooth or projection 22 on the lower end adapted to lie adjacent to the depending flange of the cover. Attached to the outer end of the levers 21 are the rods 23 connecting the levers to the spider 24 rigidly attached to the shaft 18. It is evident therefore that as the shaft 18 is moved downward and the head 13 is held at rest by being in contact with the cover on the can, the spider 24 will be moved toward the head 13 and the levers 21 will be moved to force or crimp a portion 25 of the flange 27 on the cover under the flange 26 on the can, thereby securely holding the cover in place. The head 13 is then raised, the spider 9 makes another quarter revolution, and the covered can is placed on the conveyer 4 and carried into the steam chamber.

By crimping the flange of the cover under the flange on the can at several points removed from each other, the cover is firmly held on the can, but a tight seal is not formed so that the excess air and liquid in the can readily pass out of the can when the contents are expanded by the application of heat.

This is one method of performing the operation of double-seaming the cover to the can, but in other methods the whole flange of the cover is crimped under the flange of the can. Either of these methods is equally available with the present process, so long as the initial securing of the cover to the can is not so tight but that the steam generated in cooking and the excess air, etc., may be forced out during the processing.

It is to be understood that I do not limit myself to the apparatus herein described for attaching the cover, nor to the manner in which the cover is attached, nor to the construction of the steam chamber, as all of these may be varied without departing from the spirit of my invention. The apparatus is shown and described merely for the purpose of illustration to show one means of accomplishing the desired result.

I claim:

1. The process of preserving food products in cans which consists in rigidly securing the permanent cover to the filled can, so as to retain it against displacement resulting from internal pressures and at the same time provide a vent, subjecting the filled can to heat, and then permanently sealing the cover to the can.

2. In the sanitary method of preserving food products in double seamed cans, the process which consists of applying a cover to a filled can, then performing the first step in the operation of double seaming the cover to the can, so as to retain the cover in position against displacement resulting from internal pressures while providing a vent, then subjecting the filled can to heat to cook and sterilize the contents, and then performing the remaining steps of the double seaming operation.

3. The herein described process of canning; consisting in filling a can completely closed at one end; applying a closing plate to the open end of such can; partially crimping such closing plate to the can so as to partly but permanently secure the closing plate thereto; heating the contents of the can; and finally completing the crimping of the plate to the can to hermetically seal same.

4. The herein described process of canning; consisting in filling a container body; placing a closing plate or head on the open end of the body; partially double seaming the plate to the body to retain the plate permanently in position and at the same time provide a vent; treating or cooking the contents of the partially sealed container; and thereafter completing the double seaming of the closing plate to the body to hermetically seal the container.

5. The herein described process of canning consisting in filling a flanged can, placing a flanged closing plate or head on the open end of said can, thereafter bending the flange on the closing plate under the flange on the can in such manner as to retain said plate against displacement resulting from internal pressures while providing a vent, then treating or cooking the contents of the can, and finally completing the crimping of the plate to the can to hermetically seal the same.

WILLIAM C. BUHLES.

Witnesses:
H. G. POST,
P. S. PIDWELL.